Dec. 21, 1965 R. WOLFE 3,225,208
THERMOELECTRIC POWERED SATELLITE
Filed Feb. 23, 1962 2 Sheets-Sheet 1
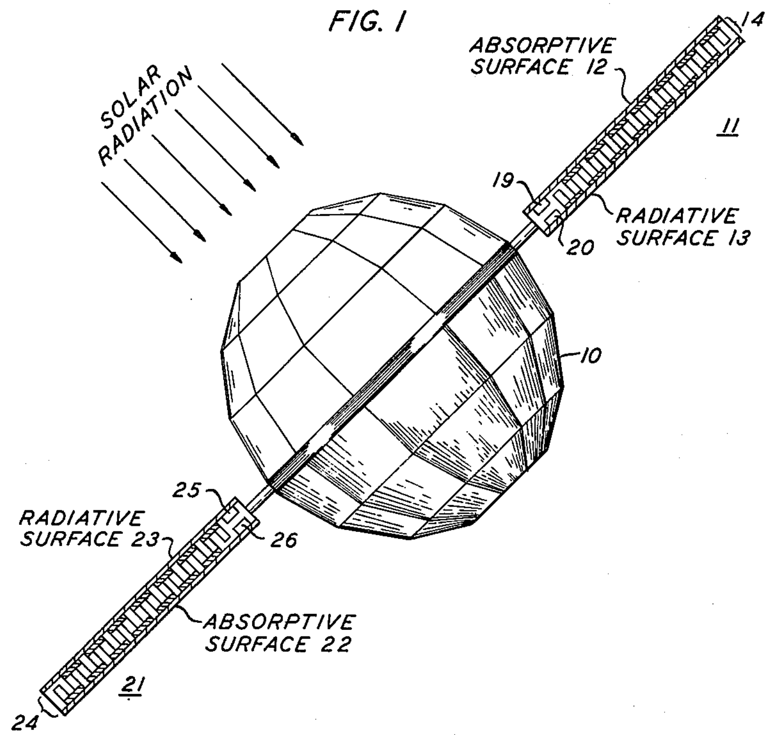
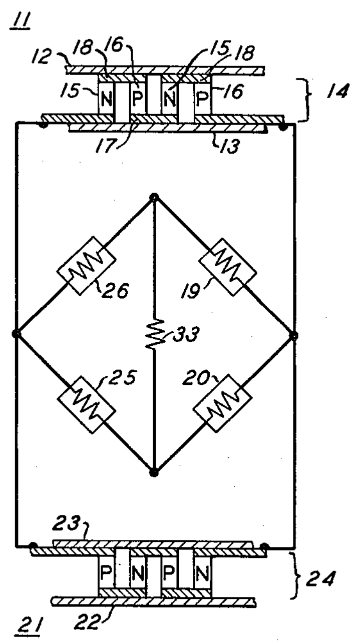
INVENTOR
R. WOLFE
BY Roy M. Porter Jr.
ATTORNEY

RADIATION AS IN FIG. 1

RADIATION REVERSED FROM FIG. 1

United States Patent Office 3,225,208

Patented Dec. 21, 1965

3,225,208

THERMOELECTRIC POWERED SATELLITE

Raymond Wolfe, New Providence, N.J., assignor to Bell Telephone Laboratories, Incorporated, New York, N.Y., a corporation of New York Filed Feb. 23, 1962, Ser. No. 174,971
7 Claims. (Cl. 307—43)

This invention relates to artificial earth satellite power supply systems and more particularly to an arrangement of thermoelectric generators for supplying power for such a satellite.

Among the several arrangements which have been tried experimentally for supplying the electric power for the electronic equipment carried by artificial earth satellites, one of the most promising in terms of weight per power output and immunity from radiation damage is the thermoelectric generator. In general, the thermoelectric generator comprises a large number of thermocouples connected together in series, parallel or a combination thereof. Each thermocouple, in turn, comprises two junctions between dissimilar metals or semiconductors. One junction, referred to as the normally hot junction, is arranged so that solar radiation is converted into heat to raise the temperature of the junction. The other junction, referred to as the normally cold junction, is arranged so that heat is radiated away from the junction. Several techniques and methods are known for maximizing the absorption and radiation, respectively, of the normally hot and normally cold junctions so that a maximum temperature differential is produced between the junctions to cause a maximum flow of current through an appropriately connected load.

Usually the satellite is not oriented in any particular way with respect to the sun even though it may be oriented with respect to the earth. Thus, a given generator will have its normally hot side directed toward the sun only part of the time and away from the sun for the remainder of the time. Thus, a plurality of generators are used, oriented in different directions, so that at least one of them is directed toward the sun even though the others are in the shade. In addition, circuit means are needed to disconnect the shaded generators from the circuit so that power from the active, illuminated generator will not be wastefully shunted through the shaded generator.

It is accordingly an object of the present invention to increase the efficiency and utility of satellite power supplies employing thermoelectric generators.

In accordance with the invention it has been recognized that a generator which has its normally cold junction directed toward the sun will produce a useful current even though this current will be of reverse voltage and substantially smaller than the normal current. Thus, a plurality of generators are arranged so that while some of them are normally illuminated and produce the predominant supply current, the remainder will be reverse illuminated and will produce a current which flows in the opposite direction from the predominant current. In accordance with the invention, two sets are connected together through a solar activated reversing switch which reverses the current paths so that these currents flow through the load in the same direction. Features of the invention reside in the nature of the reversing switch which comprises a bridge of radiation-sensitive impedances, such as thermistors or photo-conductors, associated with the hot and cold junctions of each set of generators.

These and other objects, the nature of the present invention, its various features and advantages will appear more fully upon consideration of the various illustrative embodiments now to be described in detail in connection with the accompanying drawings, in which:

FIG. 1 is a cross-sectional showing diagrammatically the components of interest in a typical satellite;

FIG. 2 is a schematic circuit drawing of the electrical connection between the components of FIG. 1.

Figure 3A:
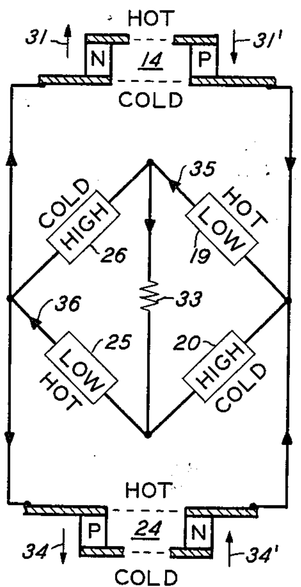
FIGS. 3A and 3B illustrate the flow of current for different conditions of illumination.

Referring more particularly to FIG. 1, a satellite arrangement of one type known as the "paddle wheel" is shown for the purpose of illustrating the principles of the invention although these principles are obviously not limited to this particular type of satellite construction. The paddle wheel form is typified by the fact that the power producing elements, whether solar batteries or thermoelectric generators, are located on a plurality of flat arms or paddles such as 11 and 21 which extend out and away from the main satellite body 10.

Paddles 11 and 21 are shown in cross-section taken normal to their broad faces to reveal a sandwich construction in which the thermocouple assembly 14 is mounted between a plane solar energy collector on one side and a plane space radiator on the other. In particular, the solar energy collector is formed on the top surface of the paddle 11 by an absorptive surface 12 that absorbs, thermalizes and makes available to thermocouple assembly 14 below it as much of the incident solar energy as possible. For this purpose, surface 12 is one which has low reflection in the visible spectrum and low radiation in the infra-red spectrum. Such a surface is sometimes referred to as a dark mirror, and is often constructed by alternate multiple layers of materials such as silicon dioxide and vapor coated aluminum. Suitable dark mirrors are commercially available and their specific construction forms no part of the present invention. The space radiator is formed on the bottom of paddle 11 by a radiative surface 13 which serves to dispose of unused heat. A suitable radiative surface comprises a layer of silicon monoxide, black matte lacquer, or red lead upon a sheet of aluminum foil.

Thermocouple assembly 14, located between absorber 12 and radiator 13, may be of any of several known designs and its details comprise no part of the present invention. As may be seen in more detail in FIG. 2, one illustrative form comprises alternate blocks of n-type semiconductive material 15 connected in series with alternate blocks of p-type semiconductive material 16. Straps or bridges 17 and 18 of conductive material form the required low resistance, ohmic junctions with the blocks 15 and 16. Blocks 15 may be of n-type lead telluride and blocks 16 may be of a p-type lead telluride-silver antimony telluride solid solution as disclosed in detail in Patent 2,995,613, granted August 8, 1961, to J. H. Wernick, for example. Bismuth telluride, silver antimony telluride, zinc antimony and similar compounds are also known to have desirable properties. While only a single series connection of elements is illustrated, it is understood that all elements may be connected in parallel or that several series assemblies may be connected in parallel.

The thermocouple assembly 14 itself can be perfectly symmetrical but because of the thermal nature of surfaces 12 and 13, the junctions of the blocks with straps 18 adjacent to absorptive surface 12 become the normally hot junctions and the junctions of the blocks with straps 17 adjacent to radiative surface 13 become the normally cold junctions.

Paddle 21 on the opposite side of satellite 10 is identical to paddle 11 except that the radiative surface 23 is located upon the top surface as shown and the absorptive surface 22 upon the bottom. Thus, the junctions of thermocouple assembly 24 adjacent to surface 22 become the normally hot junctions and those adjacent to radiative surface 23 become the normally cold junctions.

Thus, when solar radiation is received by both paddles 11 and 21 from a given direction, such as from the top as represented on FIG. 1, the thermocouples of paddle 11 will be normally illuminated, that is, surfaces 12 and 13 will be acting most efficiently according to their design. The thermocouples of paddle 21 will be reverse illuminated, that is, surfaces 22 and 23 will be acting inefficiently and contrary to their design.

In accordance with the invention it has been recognized that a radiative surface such as 23 will in fact collect some energy and that an absorptive surface such as 22 will radiate energy in sufficient quantities that a temperature differential will be produced between the junctions of such a reverse illuminated thermocouple assembly to produce a usable current. However, since current flows from cold to hot in all the n-type elements and from hot to cold in all the p-type elements as shown by the arrows 31 and 32 on FIG. 2, a normally illuminated and a reverse illuminated assembly can neither be connected directly in series nor in parallel without having the predominant or larger current from the normally illuminated assembly and the smaller current from the reverse illuminated assembly wastefully buck each other. Rather than disabling the reverse illuminated assembly, the present invention provides a solar activated bridge of impedance elements that are sensitive to the same radiation received by the surfaces of paddles 11 and 21 and which combines the currents in reinforcing directions.

According to one embodiment, the radiation-sensitive elements comprise thermistors 19 and 20 which are located adjacent to the absorptive surface 12 and the radiative surface 13, respectively, of paddle 11. Similarly, thermistors 25 and 26 are located adjacent to the radiative surface 23 and the absorptive surface 22, respectively, of paddle 21. These thermistors are responsive to the same heat as are the thermocouples of each paddle so that when thermocouple assembly 14 on paddle 11 is normally illuminated, thermistor 19 is heated and thermistor 20 is cold. At the same time the thermocouple assembly 24 of paddle 21 is reverse illuminated and thermistor 25 is hot while thermistor 26 is cold. Each thermistor has the property that its resistance is small compared with that of the load or the generator when hot and large compared to that of the load or the generator when cold. The connection of all elements may be seen in FIG. 2.

The thermistors 19, 20, 25 and 26 are connected as a bridge with each element that would be hot joining elements which at the same time would be cold. Thus, elements 19 and 25, associated with the absorptive surface 12 and the radiative surface 23, respectively, are connected as elements on opposite sides of the bridge and elements 20 and 26, associated with radiative surface 13 and absorptive surface 22, respectively, form the other pair of opposite elements. Both thermocouple assemblies 14 and 24 are connected across the same diagonal of the bridge. Load 33, which represents the current consuming equipment within satellite 10 and any storage batteries associated with this equipment, is connected across the other diagonal.

Figure 3B:
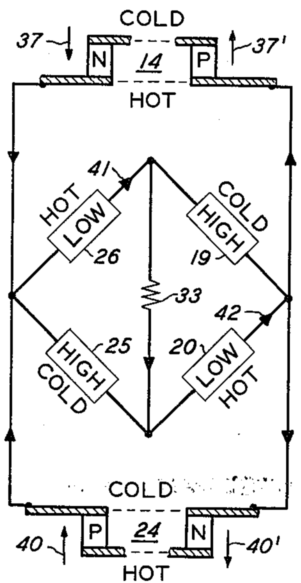

The directions in which currents flow through the components are represented in FIGS. 3A and 3B for different conditions of illumination. FIG. 3A represents the condition when the illuminating radiation comes in the direction shown on FIG. 1. Thus, assembly 14 is normally illuminated and current flows from cold to hot in the n-type elements as represented by arrow 31 and from hot to cold in the p-type elements as represented by arrow 31′. Assembly 24 is reverse illuminated so its current flow is represented by arrows 34 and 34′ for the p-type and n-type elements, respectively. At the same time thermistors 26 and 20 are cold and in their high impedance condition while thermistors 19 and 25 are hot and in their low impedance condition. Thus, the predominant current 31 from assembly 14 and the minor current 34 from assembly 22 join to flow through hot, low resistance thermistor 19 as represented by arrow 35 and to load 33. Thermistors 20 and 26 are in their cold, high resistance condition. Current from load 33 returns through thermistor 25 as represented by arrow 36.

When in the course of its travel through space, satellite 10 turns over with respect to the sun, thermocouple assembly 24 on paddle 21 will be normally illuminated, and assembly 14 on paddle 11 will be reverse illuminated. Likewise, thermistors 25 and 19 will now be cold while thermistors 26 and 20 will be hot.

These conditions are represented by FIG. 3B which shows the current from assembly 14 still flowing from cold to hot in the n-type elements and from hot to cold in the p-type elements but now in the directions represented by arrows 37 and 37′, respectively. The current flow from assembly 24 is similarly represented by arrows 40 and 40′. Hot thermistors 26 and 20 will have low impedances and cold thermistors 19 and 25 will have high impedances. Even though currents from both assemblies 14 and 24 are now reversed from the directions shown in FIG. 3A, the two currents may be seen to join to flow together in aiding relationship through low impedance thermistor 26 as represented by arrow 41, load 33, and low impedance thermistor 20 as represented by arrow 42. The high impedances of thermistors 25 and 19 inhibit the flow of current from both sources. Note that the direction of flow through load 33 remains the same in both FIGS. 3A and 3B.

Suitable photoconductive elements may be employed as alternatives to the thermistors described above for the radiation activated impedance elements of the bridge circuit. While the thermistors are responsive to heat produced by the absorption solar energy, the impedance of photoconductive elements depends directly upon the received solar energy. Thus, photoconductive elements are employed in the same way as the thermistors with the exception that the former are preferably not covered by the radiative and absorptive surfaces.

It should also be noted that a bridge of diodes or other rectifying devices would direct current through a load in a uniform direction regardless of the polarity of the source in much the same way as the above-described switching bridge. However, one feature of the invention resides in the use of thermistors of photoconductive devices in combination with the thermoelectric generators. These generators are typically low voltage devices and rectifiers are generally inefficient at low voltages. In contrast, the dark-to-light resistance ratio of photoconductors or the cold-to-hot resistance ratio of thermistors can be very large together with a light or hot resistance in either case that is very low.

The principles of the invention have been illustrated with respect to only a single pair of thermoelectric generators that have a relative 180 degrees orientation between them. Obviously the principles of the invention may be applied to any plurality of pairs having various angles between the pairs.

Present information indicates that the greatest efficiency of a thermoelectric generator is obtained by operation as described above in which each energy collector surface is optimized for absorption and each energy radiator surface is optimized for radiation. Thus, the current produced by a normally illuminated assembly will be substantially larger than that produced by a reverse illuminated assembly. However, it should be noted that the principles of the invention may be applied to a system in which the differences between the surfaces is not the maximum possible or in which there is no difference at all. For example, in one form of themoelectric generator both the collector and the radiator are given the properties of a "black body," that is, equal absorption and radiation. Even though the forward and backward currents are therefore substantially equal, their polarities still reverse and the principles of the invention are applied to connect them to a single load.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. An earth satellite power supply comprising a plurality of thermoelectric generators each having normally hot and normally cold junctions, one portion of said generators having their normally hot junctions and the remainder of said generators having their normally cold junctions oriented in substantially the same direction whereby said one portion produces a first current of one polarity and said remainder produces a second current of the opposite polarity when illuminated by solar radiation from said one direction, a load circuit, and solar activated means for directing said first and second currents through said load in the same direction and for reversing the connection of each portion to said load when the direction of said solar radiation is reversed.

2. The power system according to claim 1 wherein said solar activated means comprises a bridge of four radiation-sensitive impedances two of which are responsive to the same radiation received by the normally hot and cold junctions, respectively, of said one portion and two of which are responsive to the same radiation received by the normally hot and cold junction, respectively, of said remainder.

3. An earth satellite power supply comprising a plurality of thermocouples divided into two sets, means for collecting solar energy and means for radiating energy into space associated with each set on opposing sides thereof and arranged so that said collecting means of one and said radiating means of the other are oriented in substantially the same direction, a load circuit, and a plurality of radiation-sensitive impedance elements connecting said sets to said load, each of said elements being physically associated with one of said sides to direct current through said load along a path dependent upon the side receiving radiation.

4. The combination according to claim 3 wherein said impedance elements are arranged in a bridge, said sets being connected across one diagonal of said bridge and said load being connected across the other diagonal of said bridge.

5. The combination according to claim 3 wherein opposite elements of said bridge are elements respectively associated with a collecting means side and a radiating means side of different sets.

6. The combination according to claim 5 wherein said impedance elements are thermistors.

7. The combination according to claim 5 wherein said impedance elements are photoconductors.

No references cited.

LLOYD McCOLLUM, *Primary Examiner.*